(12) United States Patent
Kozyrev

(10) Patent No.: US 11,368,232 B1
(45) Date of Patent: Jun. 21, 2022

(54) LAUNCHER OF ELECTROMAGNETIC SURFACE WAVE PROPAGATING ALONG SEAWATER-AIR OR GROUND-AIR INTERFACE

(71) Applicant: Rockwell Collins, Inc., Cedar Rapids, IA (US)

(72) Inventor: Alexander B. Kozyrev, Iowa City, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 317 days.

(21) Appl. No.: 16/788,734

(22) Filed: Feb. 12, 2020

(51) Int. Cl.
| | |
|---|---|
| *H04B 13/02* | (2006.01) |
| *H01Q 9/28* | (2006.01) |
| *H04B 1/03* | (2006.01) |
| *H01Q 15/00* | (2006.01) |
| *H01Q 1/04* | (2006.01) |

(52) U.S. Cl.
CPC ............. *H04B 13/02* (2013.01); *H01Q 1/04* (2013.01); *H01Q 9/285* (2013.01); *H01Q 15/0086* (2013.01); *H04B 1/03* (2013.01)

(58) Field of Classification Search
CPC . H04B 13/02; H04B 1/03; H04B 1/40; H04B 5/00; H04W 4/80; H04Q 1/04; H01Q 9/285; H01Q 15/0086
See application file for complete search history.

(56) References Cited

U.S. PATENT DOCUMENTS

| | | | |
|---|---|---|---|
| 3,372,395 A | 3/1968 | Kline | |
| 3,705,407 A | 12/1972 | Wickersham | |
| 3,984,839 A | 10/1976 | Ray, Jr. | |
| 4,161,716 A | 7/1979 | Stixrud | |
| 8,805,301 B2* | 8/2014 | Dec ...................... | H04B 5/0081 455/90.1 |
| 10,361,488 B1* | 7/2019 | Ng ........................ | H01Q 13/28 |
| 2010/0227552 A1* | 9/2010 | Volanthen .............. | H04B 13/02 343/709 |
| 2018/0198536 A1 | 7/2018 | Smolyaninov | |

FOREIGN PATENT DOCUMENTS

CN 106684569 A 5/2017

* cited by examiner

*Primary Examiner* — Tuan Pham
(74) *Attorney, Agent, or Firm* — Suiter Swantz pc llo

(57) ABSTRACT

A surface wave launcher surrounds and provides structure complimentary to an antenna and converts (transforms) a near field produced by the antenna into a cylindrical surface wave structure with a strong electric or magnetic field component parallel to a launching interface and propagating two-dimensionally from the launcher. The surface wave launcher leverages the interface found along ocean-air or ground-air to increase a field strength transmitted for a given antenna size and power available. The surface wave launcher maintains a relatively small structure compared to wavelength offering mobility to a very low frequency transmitter. Due to localization of the surface wave energy near the interface, communications using the surface wave retain a desirable low probability of detection.

15 Claims, 13 Drawing Sheets

LAUNCHER OF ELECTROMAGNETIC SURFACE WAVE PROPAGATING ALONG SEAWATER-AIR OR GROUND-AIR INTERFACE

BACKGROUND

Communication systems operating at low (LF) and very low frequencies (VLF) may be very attractive for long-distance, underwater and underground (e.g., through the ground) communications due to low loss in propagation channel and an ability to penetrate and propagate where other frequencies cannot (e.g., seawater, ground).

Two-way LF and VLF communication systems require transmitters that must be installed on relatively small mobile platforms. Development of such transmitters is an extremely challenging problem for a number of reasons. First, VLF signals have extremely large wavelengths (e.g., 10-30 km) that mandate any practical antenna size must be electrically small limiting efficiency and bandwidth. This also limits the field strength which can be achieved at a certain distance from the source (for given antenna size and power available at the generator output) as well as the bandwidth of the LF/VLF signal transmitted. From this perspective, there is a need to maximize the radiated field at a certain distance from the transmitter for a fixed antenna size and a fixed amount of available power.

Second, an electrically small antenna placed close to the ground or seawater surface produces a sky wave which reflects back from the ionosphere and destructively interferes with the direct sight (ground) wave. This interference produces field minima that can disrupt communications at discrete locations.

Traditionally, a brute force approach may be employed with limited success to increase the field strength at certain distance from the source. This brute force approach may increase antenna size and/or power from the source (generator) which may not be a feasible solution due to size weight and power (SWaP) constrains. Alternatively, the sky wave excitation can be traditionally suppressed by using two or more sources located one above another and phased appropriately to steer the beam towards the ground. However, the size of this vertical structure is defined by the wavelength and can be unpractical given the wavelength in VLF range (10-30 km).

Therefore, a need remains for a system and related method which may overcome these limitations and provide a novel solution to efficiently launching a surface wave from a single antenna of reasonable size.

SUMMARY

In one aspect, embodiments of the inventive concepts disclosed herein are directed to a surface wave launcher. The surface wave launcher may comprise a metamaterial substrate comprised of 1) a fixture having a fixed circumference and a fixture plane oriented parallel to an interface, the interface sited one of: between an ocean surface and an atmosphere above the ocean surface or between an earth surface and the atmosphere above the earth surface, and 2) a plurality of metamaterial elements coupled with the fixture.

The plurality of metamaterial elements may be spatially coupled to the fixture perpendicular to the fixture plane, each one of the plurality of metamaterial elements having an equal height distal from the fixture plane, each one of the plurality of metamaterial elements spaced from another one of the of the plurality of metamaterial elements by a spacing.

The surface wave launcher may include a suspension device mechanically coupled with the fixture, the suspension device configured for suspension of the metamaterial substrate relative to the interface and an antenna centrally coupled with the fixture and oriented relative to the fixture plane, the antenna surrounded by the plurality of metamaterial elements, the antenna receives a signal from a signal generator powered by a power source, the signal generator controlled by a controller coupled with a memory.

In embodiments, the surface wave launcher, upon receiving the signal from the signal generator, transforms a near field produced by the antenna into a field structure of a cylindrical surface wave parallel with the interface while limiting a power level of a free-propagating electromagnetic spherical wave, the cylindrical surface wave coupled with the interface and propagating two-dimensionally from the antenna.

A further embodiment of the inventive concepts disclosed herein may include a method for launching a cylindrical surface wave. The method may comprise suspending a fixture relative to an interface, the interface sited one of: between an ocean surface and an atmosphere above the ocean surface or between an earth surface and the atmosphere above the earth surface. The method may also include spatially coupling a plurality of metamaterial elements normal to the fixture, each one of the plurality of metamaterial elements of an equal height distal from the fixture, each one of the plurality of metamaterial elements spaced from another one of the of the plurality of metamaterial elements by a spacing.

The method may further include coupling an antenna to the fixture oriented relative to the fixture and transforming a near field produced by the antenna into a field structure of a cylindrical surface wave parallel with the interface while limiting a power level of a free-propagating electromagnetic spherical wave, the cylindrical surface wave coupled with the interface and propagating two-dimensionally from the antenna.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
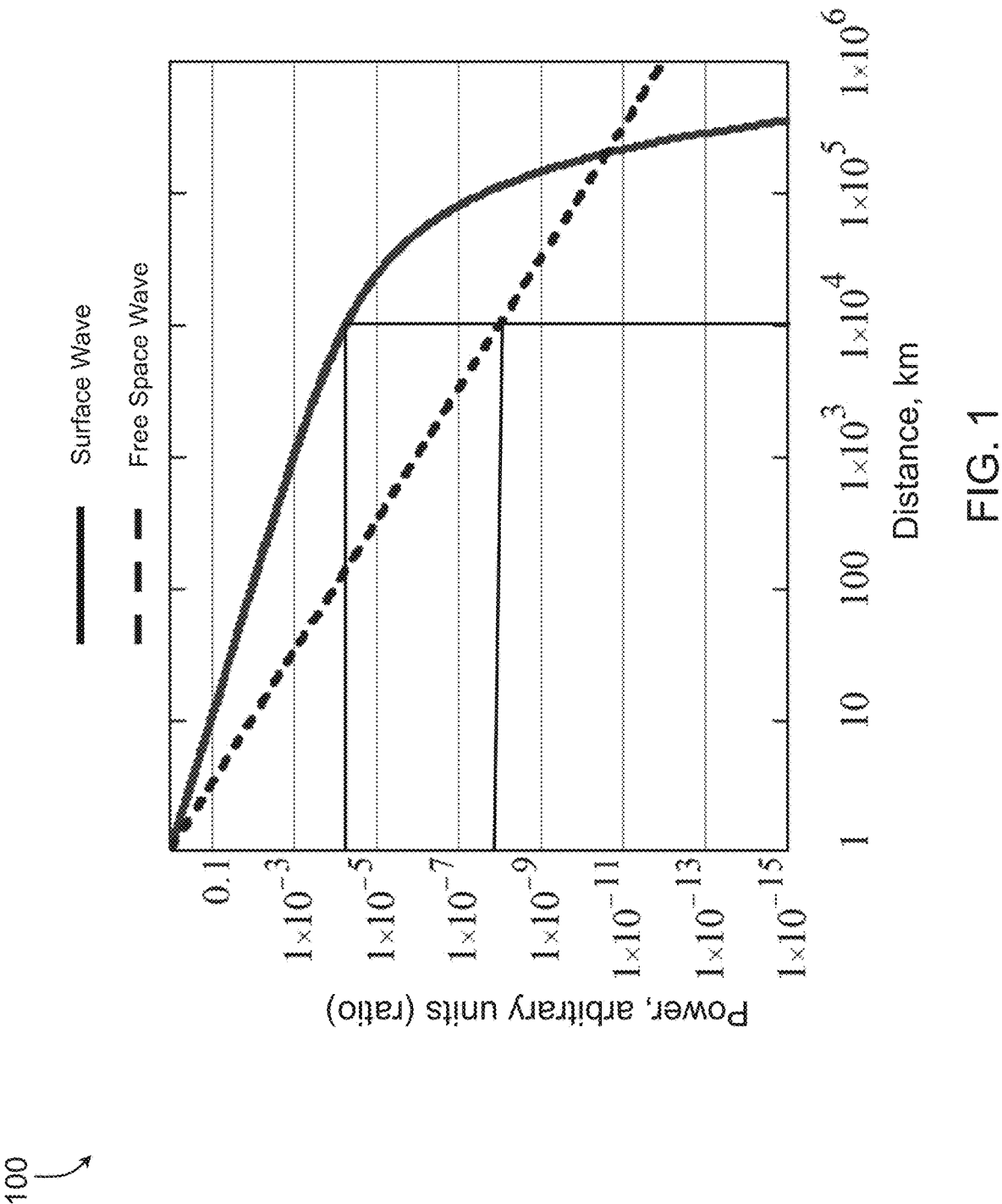
FIG. 1 is a diagram of a wave comparison in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a surface wave launcher which surrounds and provides structure complimentary to an antenna system and converts (transforms) a near field produced by the antenna into a surface wave structure with a strong electric field component parallel to a launching interface and coupled with the interface propagating two-dimensionally from the launcher. The surface wave launcher leverages the interface found along ocean-air or ground-air to increase a field strength transmitted for a given antenna size and power available. The surface wave launcher maintains a relatively small structure compared to wavelength offering mobility to a very low frequency transmitter. Due to localization of the surface wave energy near the interface, communications using the surface wave retain a desirable low probability of detection.

REFERENCE CHART

| | |
|---|---|
| 100 | Wave Comparison |
| 200 | Surface Wave Launcher |
| 210 | Metamaterial Substrate |
| 212 | Fixture |
| 214 | Metamaterial Elements |
| 216 | Antenna |
| 218 | Suspension Device |
| 220 | Cylindrical Surface Wave |
| 230 | Controller |
| 232 | Memory |
| 234 | Power |
| 236 | Signal Generator |
| 250 | Interface |
| 252 | Fixture plane |
| 254 | 2D Propagation |
| 300 | Disc shaped embodiment |
| 314 | Wire Spacing (a) |
| 400 | Top View |
| 418 | Diameter |
| 500 | Metamaterial Element Detail |
| 510 | Oval Shape Embodiment |
| 516 | Array of Apertures |
| 520 | Straight Wires |
| 522 | Fixed Value Capacitor Wire |
| 524 | Tunable Value Capacitor Wire |
| 526 | Lumped Component Resonator |
| 528 | Magnetic Diploe Resonator |
| 530 | Folded Wire |

| | |
|---|---|
| 600 | Side View of Launcher |
| 700 | E/H Field Poynting vector results |
| 800 | E-Field magnitude |
| 900 | H-Field magnitude |
| 1000 | Method Flow |

FIG. 1

Referring now to FIG. 1, a diagram of a wave comparison in accordance with an embodiment of the inventive concepts disclosed herein is shown. The graph may represent a comparison 100 of attenuation of the radiated power (Po) over distance in (km) (r) in the conventional free propagating spherical wave versus cylindrical surface wave. In contrast to the conventional free propagating spherical wave whose power attenuates as $1/r^2$ with distance, the surface wave may comprise a cylindrical wave with power attenuating as $1/r$.

Generally, the power of a free space wave (PFw) may attenuate following a formula (1):

$$\frac{P_{FW}}{P_0} = \frac{1}{r^2} \quad (1)$$

while the power of a surface wave ($P_{sw}$) may attenuate following a formula (2):

$$\frac{P_{SW}}{P_0} = \frac{\exp(-2r/L_r)}{r} \quad (2)$$

where $L_r$ may be a function of wavelength and complex dielectric permittivity of water (or ground).

Communications using the surface wave may maintain a clear advantage in terms of field strength up to certain distances, which may be quite long while operating within a very low frequency (VLF) range. For example, at a distance of 10,000 km, the surface wave may maintain a power almost four orders of magnitude higher the power of the free space or spherical wave.

FIG. 2

Figure 2:
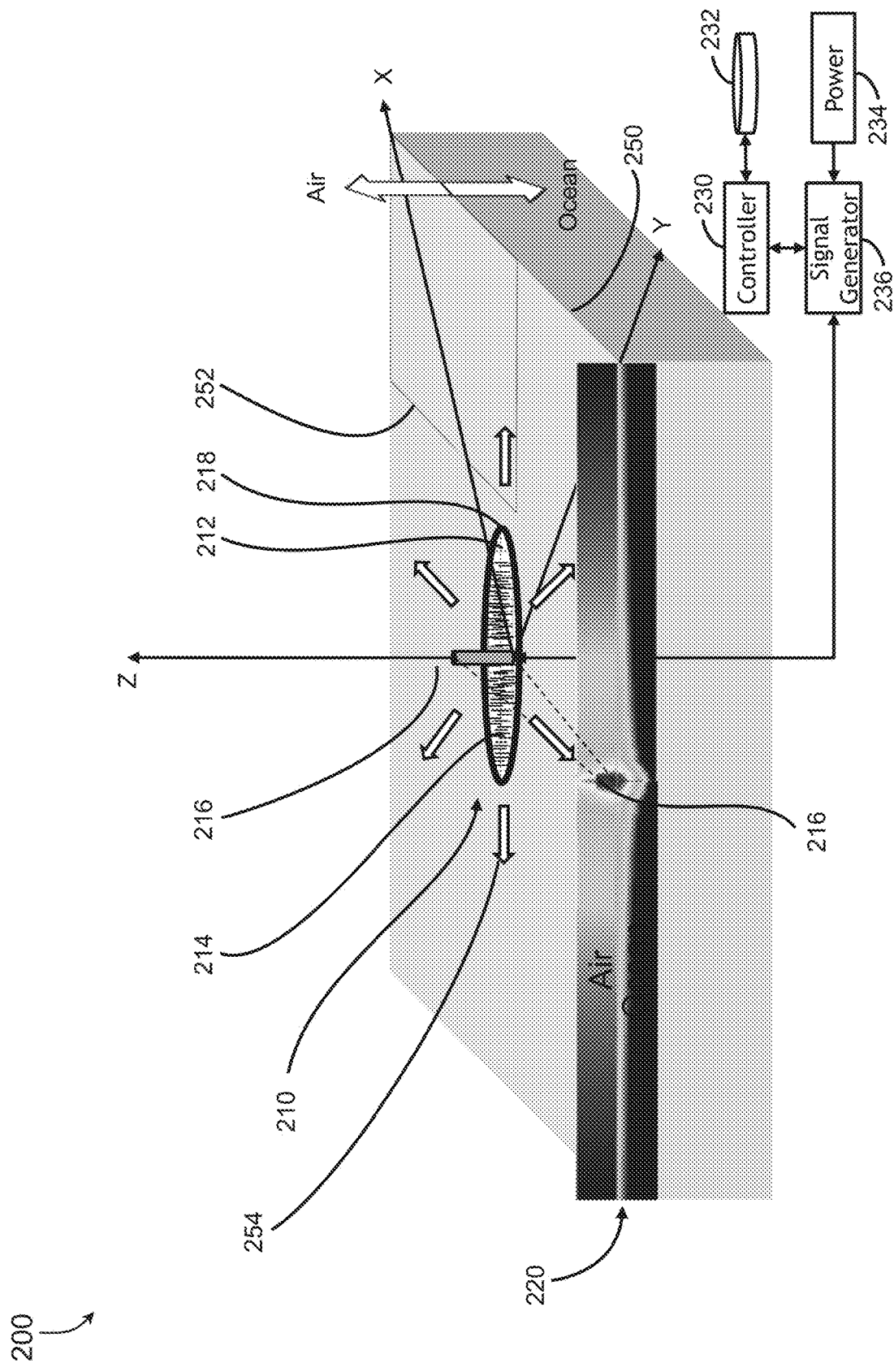
FIG. 2 is a diagram of a surface wave launcher in accordance with an embodiment of the inventive concepts disclosed herein.

Referring now to FIG. 2, a diagram of a surface wave launcher in accordance with an embodiment of the inventive concepts disclosed herein is shown. A surface wave launcher 200 may represent an electrically small antenna. The surface wave launcher 200 may include a metamaterial substrate 210 comprised of a fixture 212 coupled with a plurality of metamaterial elements 214. The fixture 212, may have a fixed circumference and oriented parallel to a fixture plane 252. The surface wave launcher 200 may include a suspension device 218 mechanically coupled with the fixture 212, the suspension device 218 configured for suspension of the fixture 212 relative to an interface 250.

In one embodiment of the inventive concepts disclosed herein, the suspension device 218 may be rigid and mechanically coupled with a circumference of the fixture 212. Another embodiment of the suspension device may include a rigid flotation device configured for suspension of the surface wave launcher 200 above the interface 250, partially submerged within the interface 250, and submerged below the interface 250.

The interface 250 maybe parallel with the fixture plane 252 and defining an interface between an ocean surface and an atmosphere above the ocean surface or between an earth surface and the atmosphere above the earth surface.

The metamaterial substrate 210 may include the plurality of metamaterial elements 214 spatially (equally or unequally spaced) coupled to the fixture 212 and perpendicular to the fixture plane 252, each one of the plurality of metamaterial elements 214 having an equal height distal from the fixture plane 252, each one of the plurality of metamaterial elements 214 equally spaced from another one of the of the plurality of metamaterial elements by a spacing.

In one embodiment, the plurality of metamaterial elements 214 may extend distally from the fixture 212 in either direction (e.g., vertically perpendicular to the fixture plane 252 in either positive z or negative z).

For transmission, the surface wave launcher 200 may include an antenna 216 centrally coupled with the fixture 212 and oriented relative to the fixture plane 252. The antenna 216 surrounded by the plurality of metamaterial elements 214, the antenna 216 receives a signal from a signal generator 236 coupled with a controller 230 and a power source 234, the controller coupled with a memory 232.

In one embodiment of the inventive concepts disclosed herein, the surface wave launcher 200 may be agnostic to a particular antenna type. Some antenna types functional within the surface wave launcher 200 may include a vertical electric dipole or monopole antenna as well as a magnetic dipole or monopole antenna. The antenna 216 may be oriented normal to the fixture 212 as well as at a plurality of angles relative to the fixture 212.

In one embodiment of the inventive concepts disclosed herein, depending on the type of antenna system and metamaterial elements 214 (having electrical or magnetic resonances), the excited cylindrical surface wave may be either a transverse magnetic (TM) or transverse electric (TE) cylindrical surface wave. In some embodiments, an antenna array may be appropriate for a desired operational performance (see FIG. 5). In the case of a vertical electric dipole placed above the metamaterial substrate 210 having effective negative dielectric permittivity, the surface wave launcher 200 may excite TM cylindrical surface wave.

The surface wave launcher 200, upon receiving the signal from the controller 230, transforms a near field produced by the antenna 216 into a field structure of a cylindrical transverse magnetic (TM) surface wave 220 parallel with the interface 250 while limiting a power level of an undesirable free-propagating electromagnetic spherical wave. The cylindrical surface wave 220 (or surface plasmon-polariton) may be coupled with the interface 250 propagating 254 two-dimensionally from the antenna 216.

FIG. 3

Figure 3:
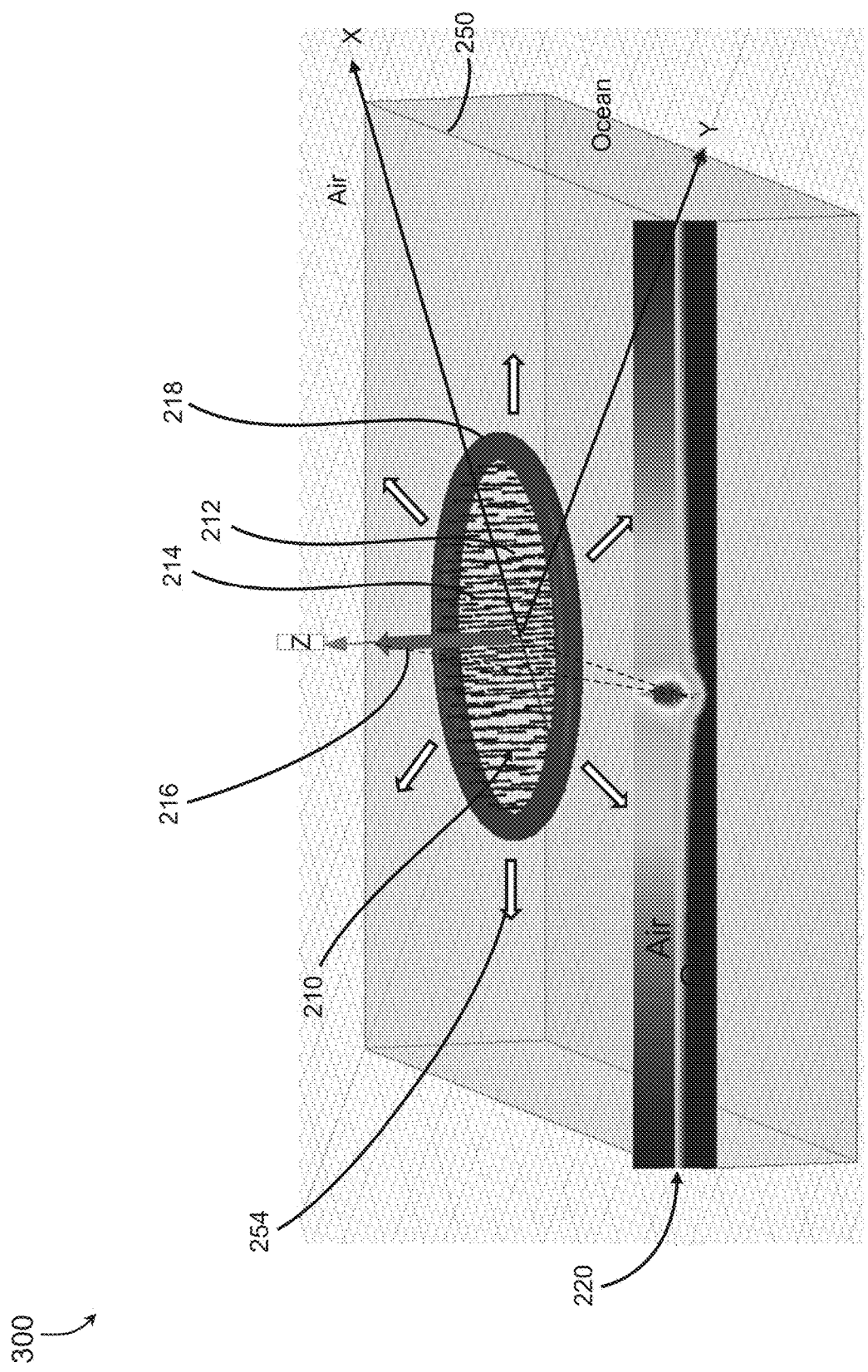
FIG. 3 is a diagram of a disc shaped embodiment of exemplary of an embodiment of the inventive concepts disclosed herein.

Referring now to FIG. 3, a diagram of a disc shaped embodiment of exemplary of an embodiment of the inventive concepts disclosed herein is shown. The disc shaped arrangement 300 may include a perspective view of the overall surface wave launcher 200.

In one embodiment of the inventive concepts disclosed herein, the surface wave launcher 200 may include the metamaterial substrate 210 in the shape of a disc constructed of a wire medium (e.g. metal cut-wire array). The individual metamaterial elements 214 of the wire medium may be held together by a "fish net" fixture 212 deployed at certain level with respect to the water-air interface 250 and supported by the suspension device 218.

Utilization of the embedded fixed value and tunable components may help to adjust metamaterial properties for a specific operating frequency and also reduce a thickness (height) of the overall structure of the surface wave launcher 200. In one embodiment of the inventive concepts disclosed herein, the metamaterial substrate 210 may be implemented as a disc of metamaterial having negative dielectric permittivity maintaining a height of approximately one meter. An additional embodiment may include an anisotropic metamaterial having a negative normal to an interface component of a dielectric tensor as the metamaterial substrate 210.

In another embodiment, the metamaterial substrate 210 may further comprise one of: a negative magnetic permeability metamaterial and an anisotropic metamaterial having a negative normal to the interface component of a magnetic permeability tensor.

In one embodiment of the inventive concepts disclosed herein, the surface wave launcher 200 may transmit the cylindrical surface wave 220 within a plurality of frequencies (e.g., VLF up to optical frequencies), one frequency range of the plurality of frequencies includes approximately 3 kHz to 30 kHz within a very low frequency (VLF) band. In embodiments, a frequency for which the surface wave launcher 200 is configured may define a scale of an overall structure.

FIG. 4

Figure 4:
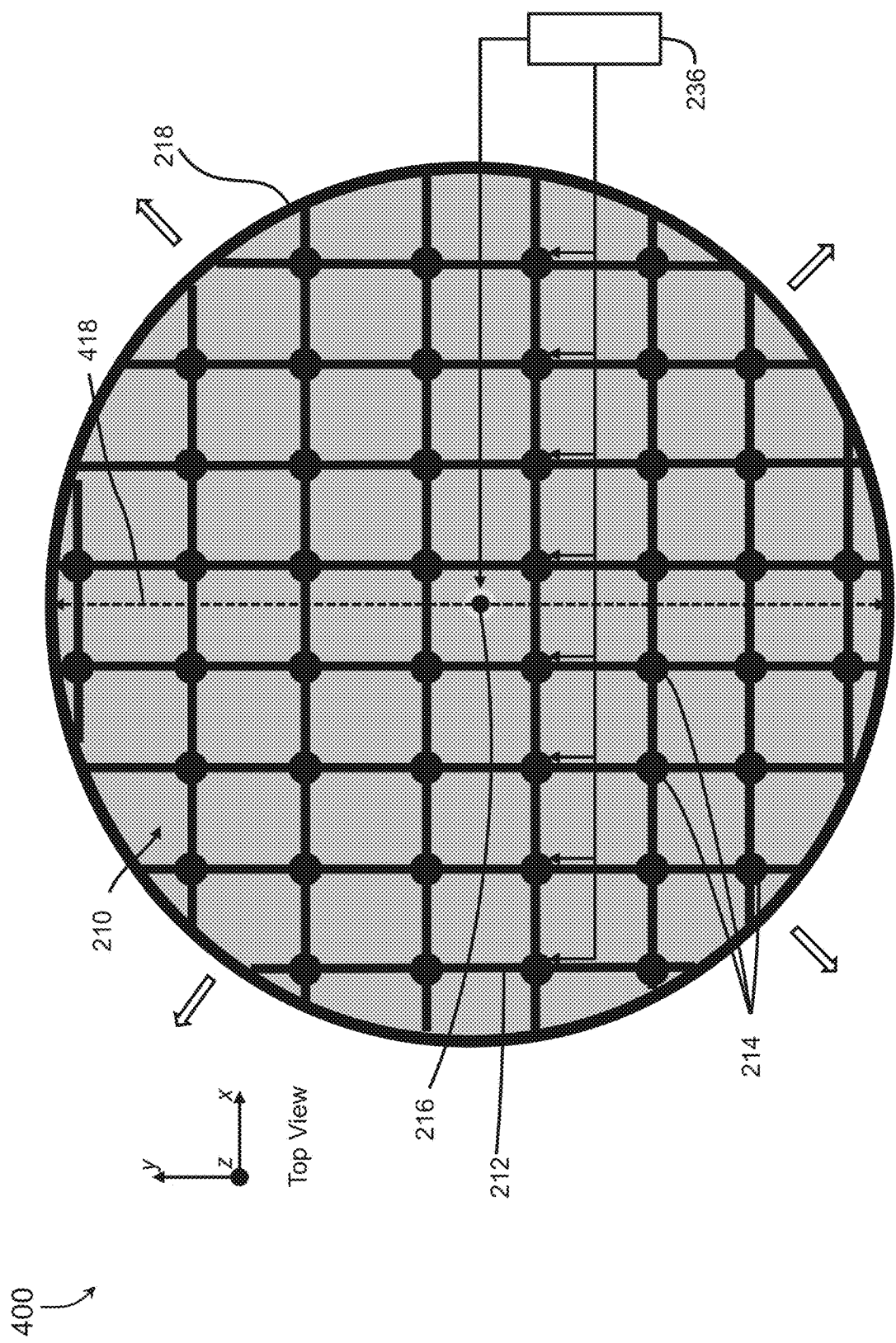
FIG. 4 is a diagram of a top view of a disc shaped exemplary of one embodiment of the inventive concepts disclosed herein.

Referring now to FIG. 4, a diagram of a top view of a disc shaped exemplary of one embodiment of the inventive concepts disclosed herein is shown. Top view 400 may indicate a disc shaped surface wave launcher 200 with detail of each of the plurality of metamaterial elements 214. In one embodiment of the inventive concepts disclosed herein, the surface wave launcher 200 may maintain a fixed diameter 418 and limit a horizontal circumference of the surface wave launcher 200 to enable transport and ease of mobility. In one embodiment, the surface wave launcher may maintain an approximate circumference of less than approximately 200 meters to enable efficient launching of the cylindrical surface wave 220 yet limit the SWaP considerations.

In embodiments, each of the plurality of metamaterial elements 214 may couple with the fixture 212 (e.g., a net-type fixture) while the signal generator 236 may operatively couple with the antenna 216 as well as each one of the plurality of metamaterial elements 214 to efficiently launch the cylindrical surface wave 220.

Compared to the size of the wavelengths (e.g., VLF) involved (e.g. tens of km), the fixed diameter 418 of the surface wave launcher 200 may be considerably small. In one embodiment of the inventive concepts disclosed herein, the diameter 418 may be approximately 50 meters. This relatively small structure may function to efficiently produce the cylindrical surface wave 220 which is bound to the interface (e.g., sea water-air boundary).

In one embodiment of the inventive concepts disclosed herein, the surface wave launcher 200 may be configured for reception of a signal within a frequency range for which the surface wave launcher 200 was configured.

FIG. 5

Figure 5:
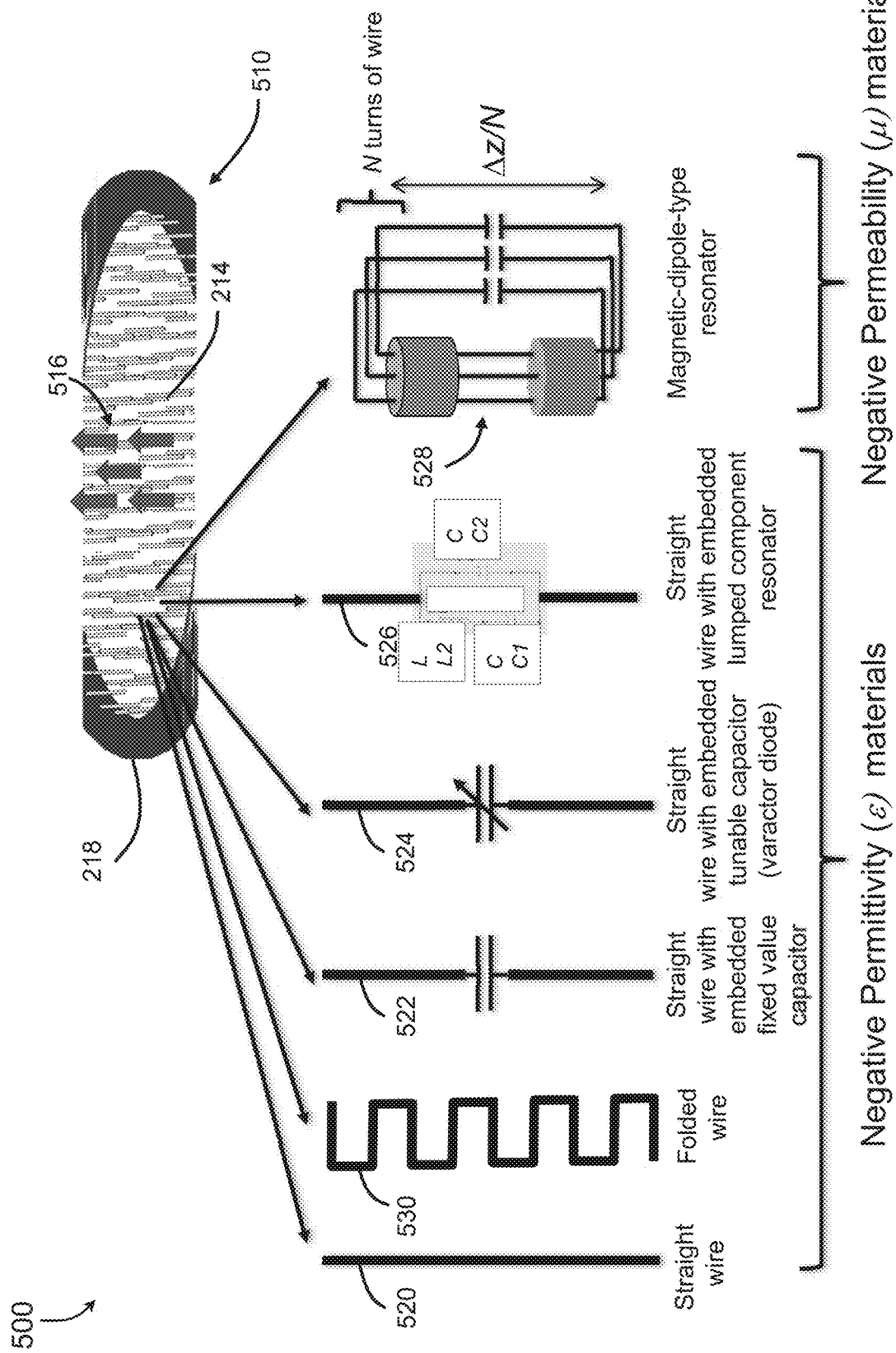
FIG. 5 is a diagram of a metamaterial element detail in accordance with one embodiment of the inventive concepts disclosed herein.

Referring now to FIG. 5, a diagram of a metamaterial element detail in accordance with one embodiment of the inventive concepts disclosed herein is shown. Metamaterial element detail 500 may include a plurality of embodiments of the plurality of metamaterial elements 214. Coupled normally to the fixture 212, each metamaterial element 214 may be constructed of alternate materials and function to efficiently launch the cylindrical surface wave 220.

In one embodiment of the inventive concepts disclosed herein, the metamaterial substrate 210 may be formed by the plurality of metamaterial elements 214. Different types of metamaterial elements 214 may include a straight wire 520 tuned to a specific equal (or unequal) height, a folded wire 530, a straight wire with an embedded fixed value capacitor 522, a straight wire with an embedded tunable capacitor 524 (e.g., varactor diode), and a straight wire with an embedded lumped component resonator 526. The plurality of metamaterial elements 214 such as described above may form a plurality of metamaterial substrates 210 having negative permittivity. Typically, a particular type of metamaterial substrate 210 may employ metamaterial elements 214 of a certain type. However, combining different types of metamaterial elements 214 in single metamaterial substrate 210 is also possible to achieve specific functionality of the launcher.

In additional embodiments, the surface wave launcher 200 may employ a plurality of elements having magnetic resonance. One embodiment of such metamaterial element may include a magnetic-dipole-type resonator 528 with N turns of wire and a specific dimension in the vertical (Z). The metamaterial substrate 210 formed by plurality of the magnetic-dipole-type resonators 528 may maintain negative magnetic permeability (p). In one embodiment, a ferrite material may be included within the magnetic-dipole-type resonator 528.

The antenna 216 may be formed by a single electrically small aperture or by an array of electrically small apertures 516. In case of an antenna array, phasing of individual array elements 516 and plurality of metamaterial elements 214 may mimic the field structure of the excited cylindrical surface wave 220 and may significantly improve the efficiency of its excitation. Here, the array of electrically small apertures may be specifically configured for transmission of a directional cylindrical surface wave 220. The metamaterial substrate 210 may also play a role as a matching element and may assist to improve overall bandwidth of the surface wave launcher 200.

In one embodiment of the inventive concepts disclosed herein, the additional shapes other than a disc may fall within the scope of the inventive concepts disclosed herein and may find function to efficiently launch the cylindrical surface wave 220. An oval shape 510 parallel to the fixture plane 252 may prove useful as one shape available to the surface wave launcher 200.

FIG. 6

Figure 6:
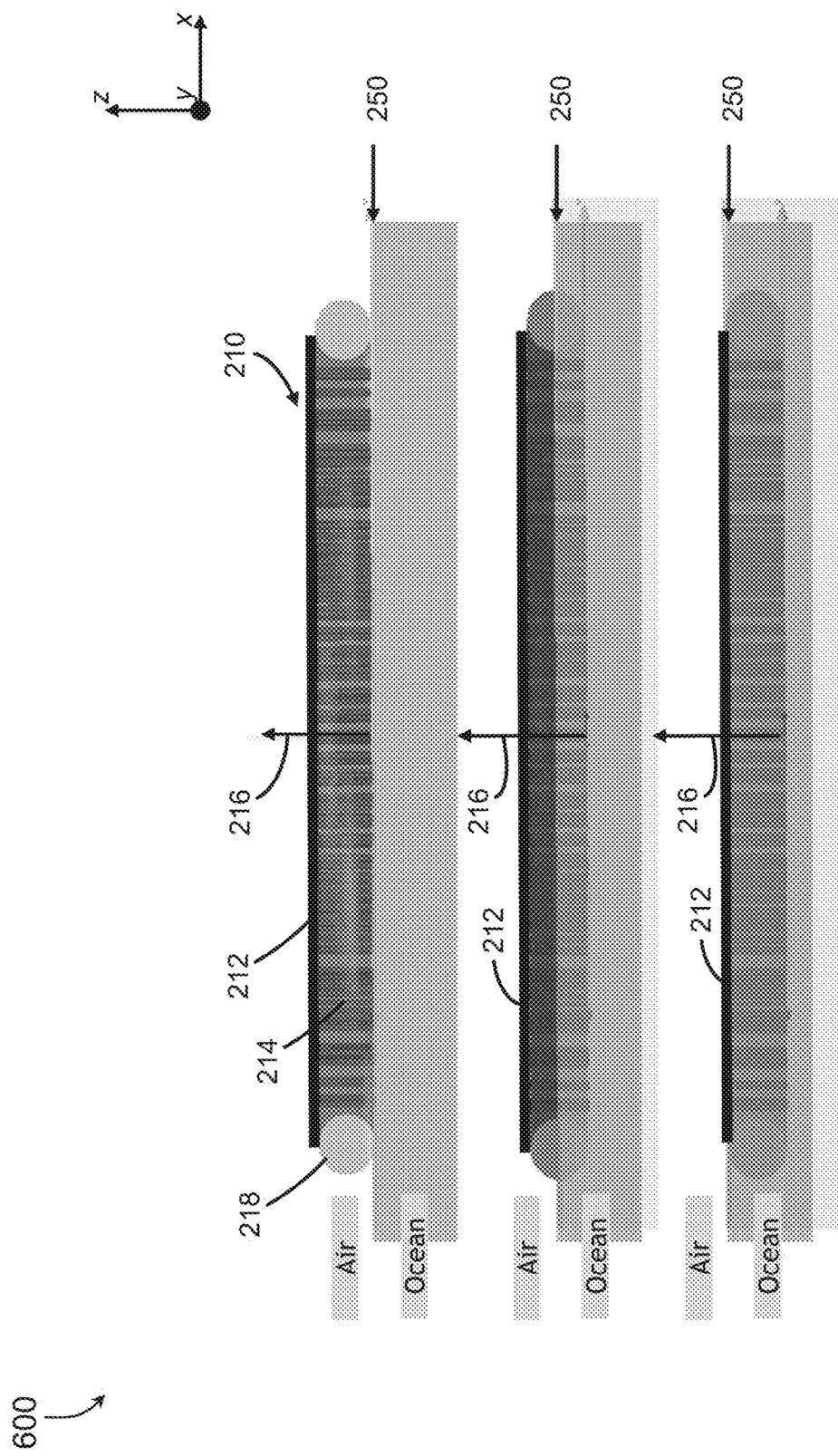
FIG. 6 is a diagram of an exemplary side view in accordance with one embodiment of the inventive concepts disclosed herein.

Referring now to FIG. 6, a diagram of an exemplary side view in accordance with one embodiment of the inventive concepts disclosed herein is shown. The side view 600 may indicate a plurality of positions along the z axis the surface wave launcher 200 may be functional relative to the interface 250.

In one embodiment of the inventive concepts disclosed herein, the surface wave launcher 200 may be partly or entirely submerged to the ocean (or any water). The antenna 216 may be placed along the z axis above the disc or within the disc. Here, the suspension device 218 may suspend the surface wave launcher 200 distally separate from the interface (e.g., with no space or a gap between the interface and the surface wave launcher 200), partially within the interface, and within the interface.

In one embodiment of the inventive concepts disclosed herein, the suspension device 218 mechanically couple with the metamaterial substrate 210 to suspend the surface wave launcher 200 above the earth surface, partially within the earth surface, and beneath the earth surface. The principles described herein may be frequency agnostic and useful at the plurality of frequencies. Also, similar principles may be employed to implement the surface wave launcher 200 within a ground application.

Contemplated herein, terrain and gravity waves on the water surface may aid the surface wave launcher 200 to enhance a performance by altering a structure of the surface wave launcher 200. Natural terrain and gravity waves at the interface 250 may introduce a natural stratification of the dielectric properties of the interface 250 and thus form a natural metamaterial layer separating air and ground (or sea water).

In one embodiment of the inventive concepts disclosed herein, the surface wave launcher 200 may be employed as a relay station to receive a desired signal and launch the cylindrical surface wave 220 which may include a retransmission of the desired signal.

FIG. 7A 7B

Figure 7A:
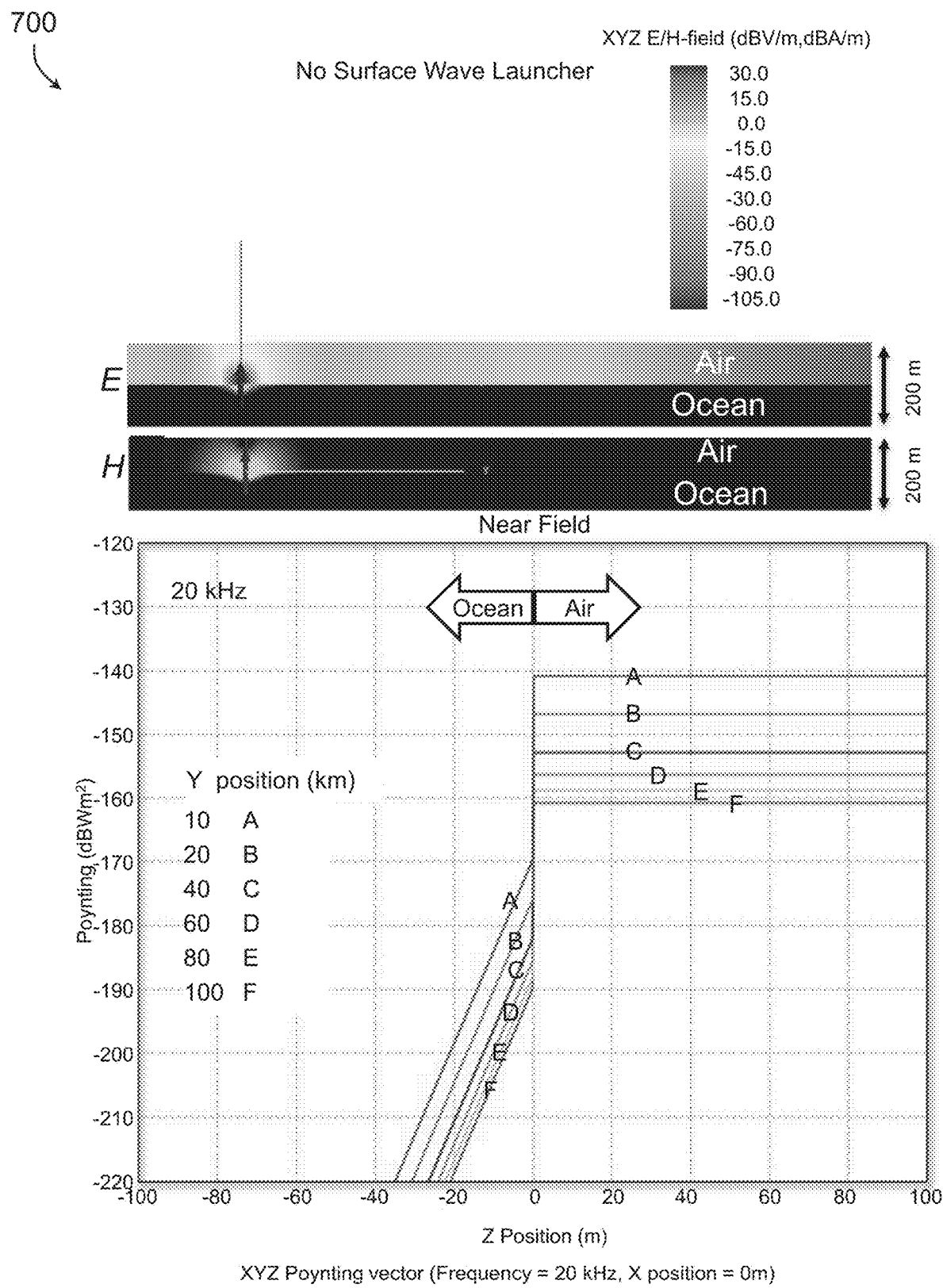
FIGS. 7A and 7B are graphs of exemplary magnitudes of electric field (E-field) distribution, magnetic field (H-field) distribution and Poynting vector results associated with one embodiment of the inventive concepts disclosed herein.
Figure 7B:
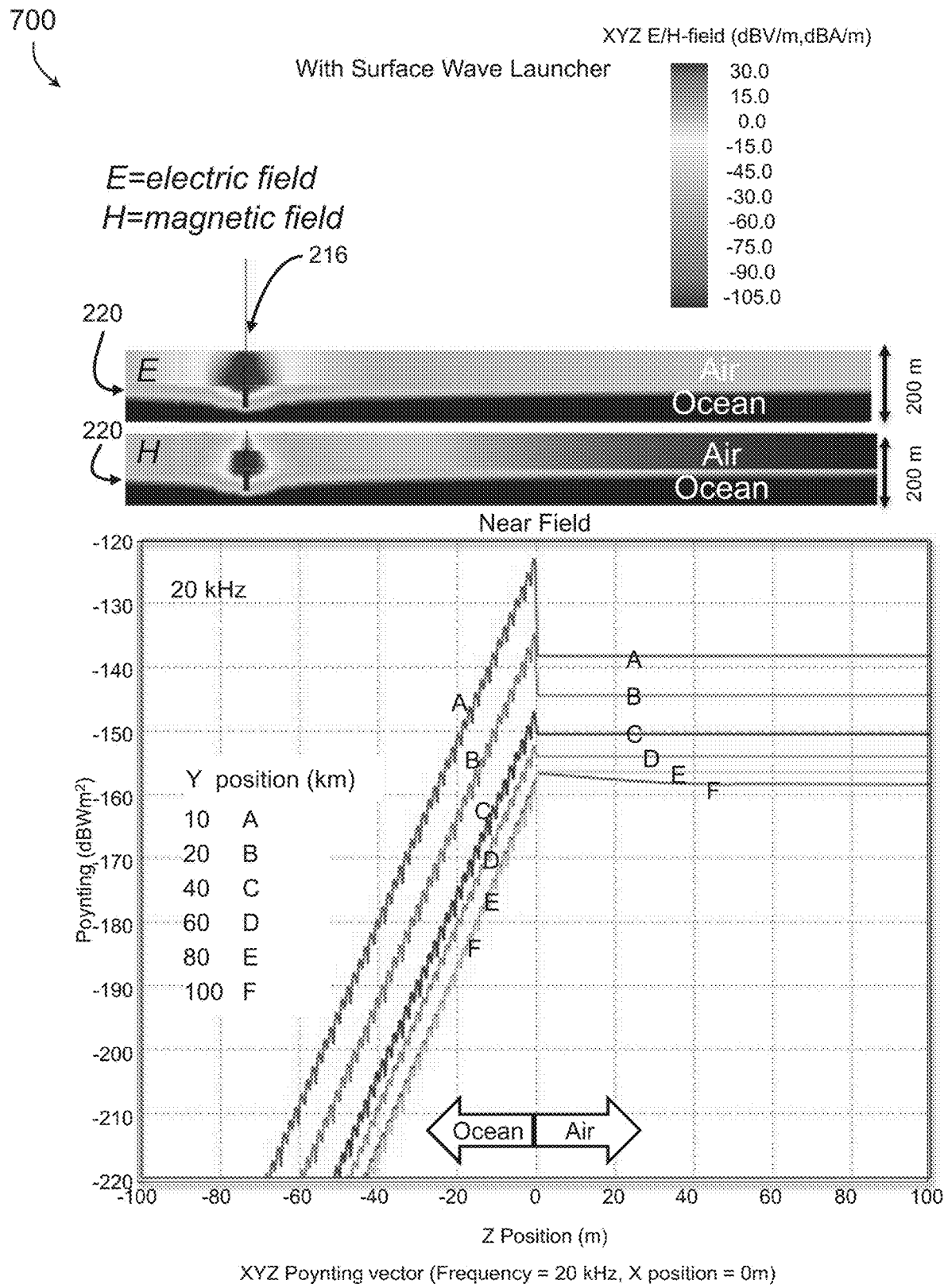

Referring now to FIGS. 7A and 7B, graphs of exemplary magnitudes of electric field (E-field) distribution, magnetic field (H-field) distribution and Poynting vector results associated with one embodiment of the inventive concepts disclosed herein are shown. Graphs 700 may indicate results of exemplary Feko simulation in which the surface wave launcher 200 launches a cylindrical surface wave 220 at an exemplary 20 kHz. The surface wave launcher 200 may have an exemplary 50-meter diameter and an exemplary one-meter height and may be suspended slightly above the interface 250.

Here, the surface wave launcher 200 may launch the cylindrical surface wave 220 at an exemplary 20 kHz. Results of an electrical (E) and magnetic (H) field distribution near the interface 250 with the surface wave launcher 200 (FIG. 7B) and without (FIG. 7A) the surface wave launcher 200.

FIG. 7A may indicate curves without the surface wave launcher 200 indicating a conventional antenna transmitting a spherical wave whereas FIG. 7B may indicate curves including the surface wave launcher 200. The curves may indicate (1) an efficient generation of the surface wave propagating 254 along the interface 250 boundary and (2) significant electric and magnetic fields at fixed distance from the surface wave launcher 200 source. Each graph may indicate a Y-position at various distances from the surface wave launcher 200. Here, distances (km) of 10 (A curve), 20 (B curve), 40 (C curve), 60 (D curve), 80 (F curve), and 100 (F curve) may indicate a magnitude of the Poynting vector in $dBW/m^2$ at the indicated distance.

As indicated in FIG. 7B, the surface wave launcher 200 may present a significant increase in power penetrating to the ocean over similar curves of a conventional antenna in FIG. 7A. In embodiments, the cylindrical surface wave 220 maintains a power which attenuates inversely with the distance from the surface wave launcher 200.

FIG. 8A 8B

Figure 8A:
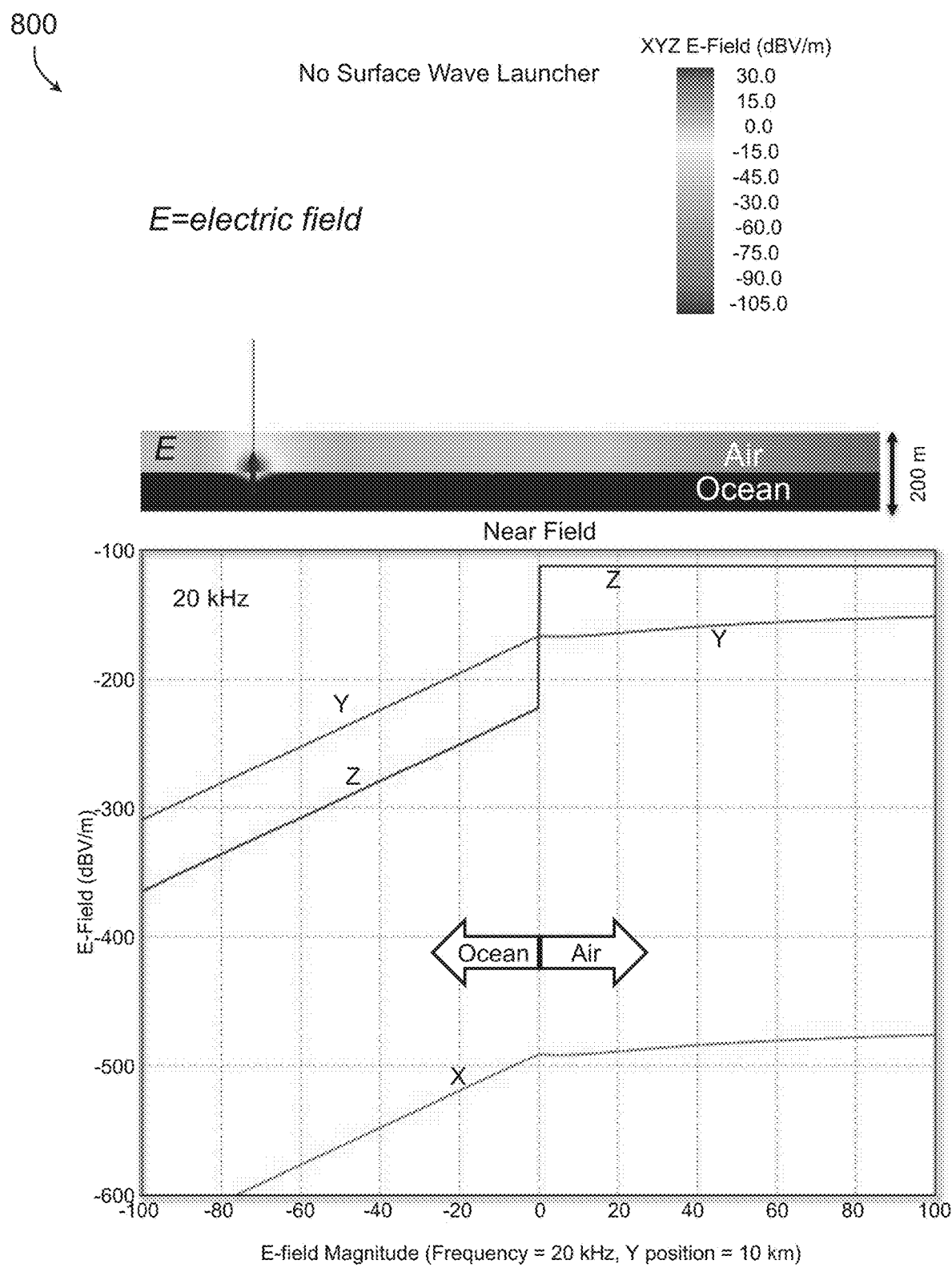
FIGS. 8A and 8B are graphs of exemplary E-field magnitude associated with one embodiment of the inventive concepts disclosed herein.
Figure 8B:
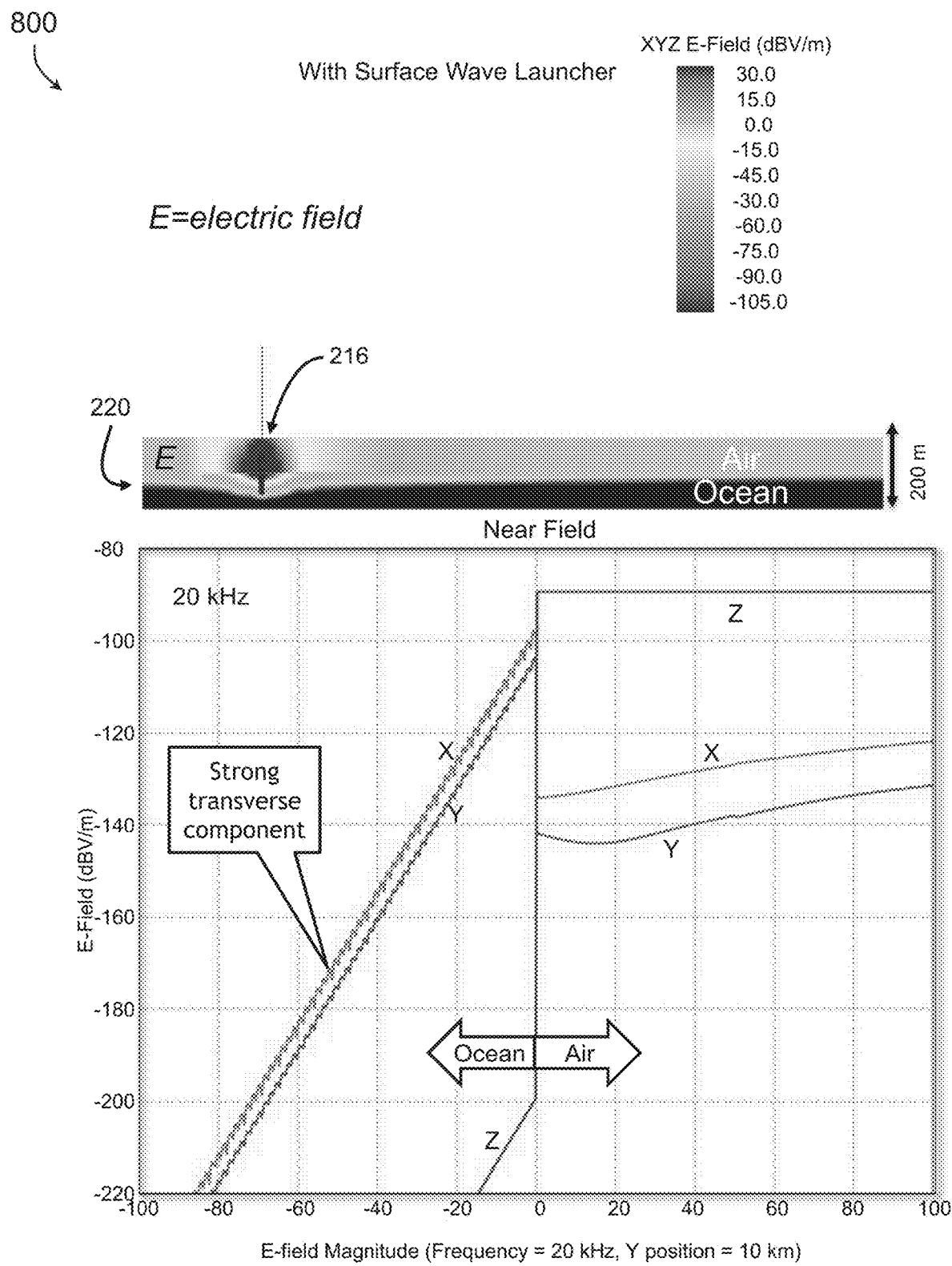

Referring now to FIGS. 8A and 8B, graphs of E-Field magnitude exemplary of one embodiment of the inventive concepts disclosed herein are shown. FIGS. 8A and 8B may indicate 1) distribution of E-field (magnitude) and 2) magnitude of x, y and x components of E-field vs vertical axis z. Both without the surface wave launcher 200 (FIG. 8A) and with (FIG. 8B) may indicate a dramatic alteration of the E-Field structure in dBV/m also at an exemplary 20 kHz. FIG. 8B may indicate, as the E-Field structure altered, a strong transverse component may be accurate indication of the cylindrical surface wave 220 of high electric field capable of penetrating deep into the ocean.

FIG. 9A 9B

Figure 9A:
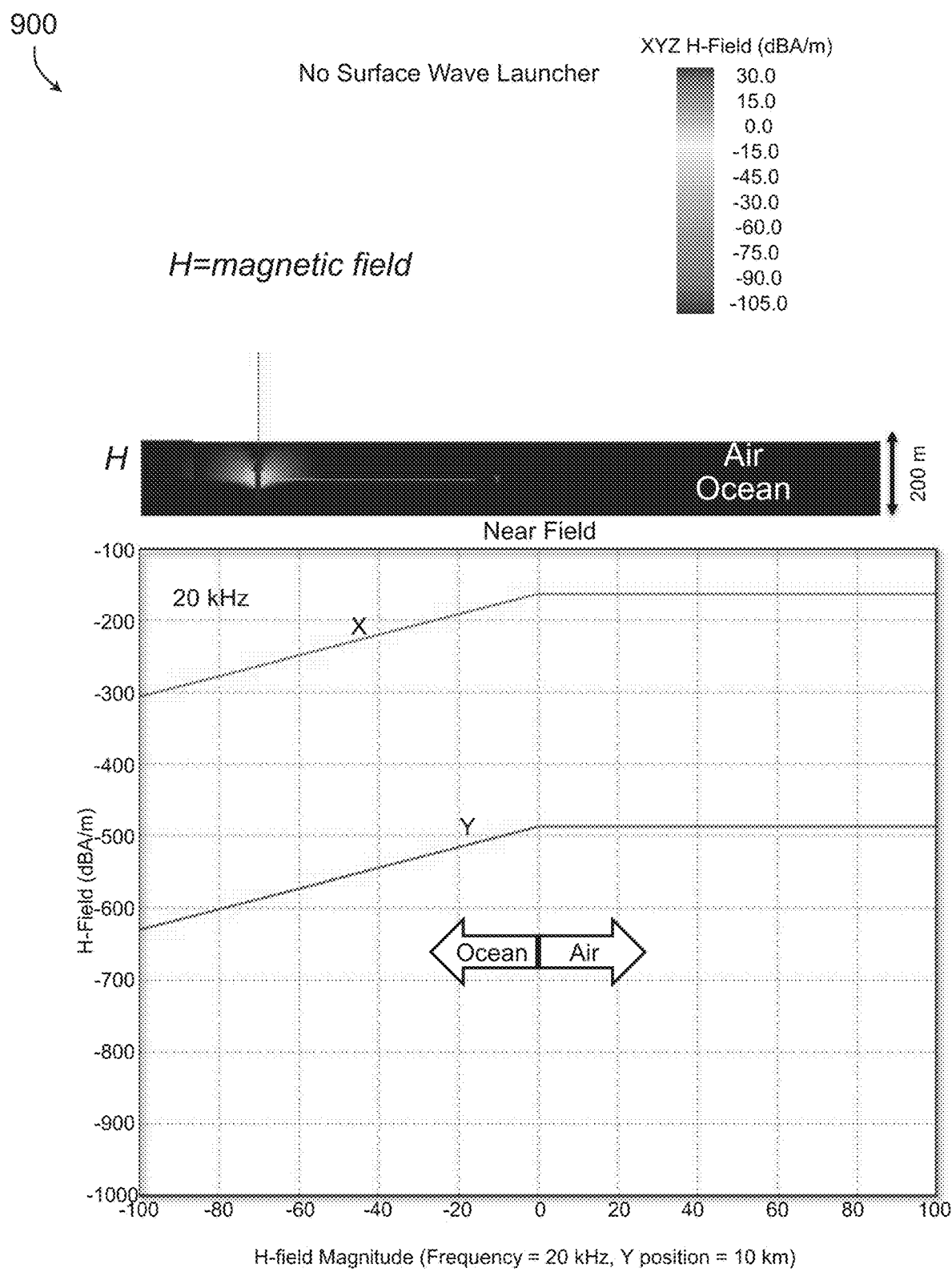
FIGS. 9A and 9B are graphs of H-Field magnitude exemplary of one embodiment of the inventive concepts disclosed herein.
Figure 9B:
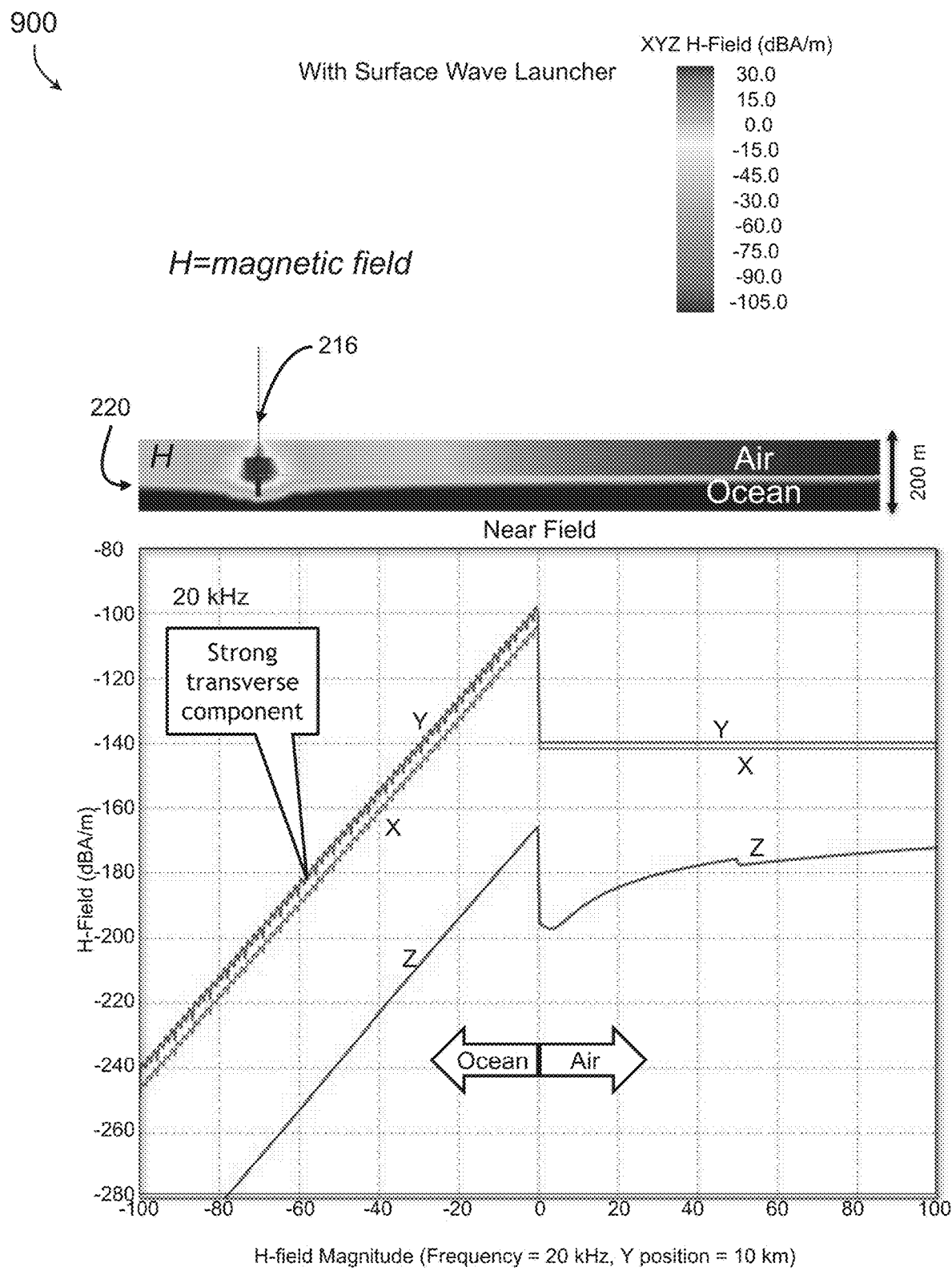

Referring now to FIGS. 9A and 9B, graphs of H-Field magnitude associated with one embodiment of the inventive concepts disclosed herein are shown. FIGS. 9A and 9B may also indicate: 1) distribution of H-field (magnitude) and 2) magnitude of x, y and x components of H-field vs vertical axis z. Both without the surface wave launcher 200 (FIG. 9A) and with (FIG. 9B) may indicate a dramatic alteration of the H-Field structure in dBA/m also at an exemplary 20 kHz. FIG. 9B may indicate, as the H-Field structure altered, a strong transverse component may be accurate indication of the cylindrical surface wave 220.

FIG. 10 METHOD

Figure 10:
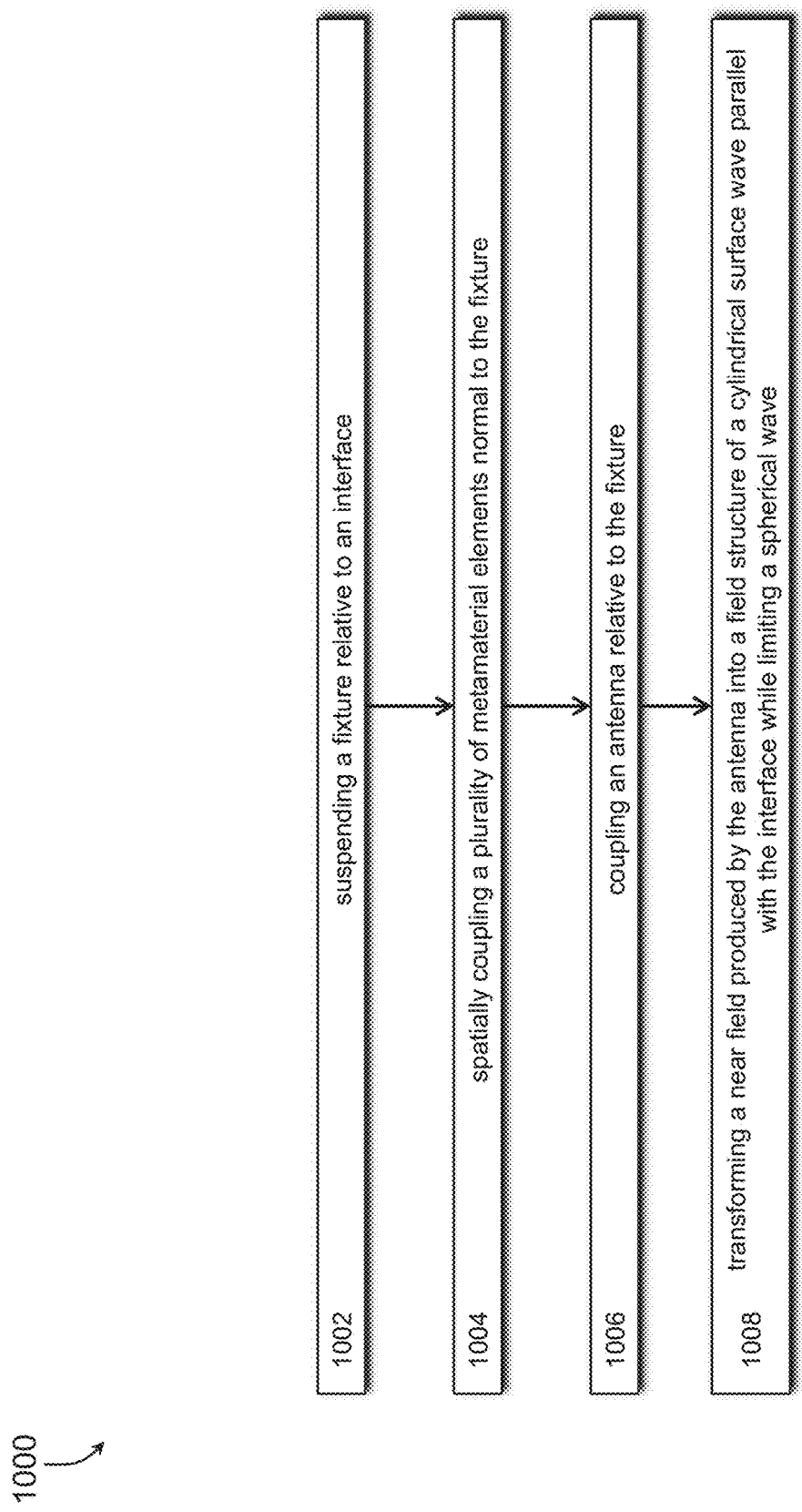
FIG. 10 is a diagram of a method flow in accordance with one embodiment of the inventive concepts disclosed herein.

Referring now to FIG. 10, a diagram of a method flow in accordance with one embodiment of the inventive concepts disclosed herein is shown. A method flow 1000 for launching a cylindrical surface wave may include, at a step 1002, suspending a fixture 212 relative to an interface 250, the interface 250 one of: between an ocean surface and an atmosphere above the ocean surface or between an earth surface and the atmosphere above the earth surface.

The method may include, at a step 1004, spatially coupling a plurality of metamaterial elements 214 normal to the fixture 212, each one of the plurality of metamaterial elements 214 of an equal height distal from the fixture 212, each one of the plurality of metamaterial elements 214 spaced from another one of the of the plurality of metamaterial elements 214 by a spacing. At a step 1006, the method may include coupling an antenna 216 in a center of the fixture 212 and oriented relative to the fixture 212.

The method may include, at a step 1008, transforming a near field produced by the antenna 216 into a field structure of a cylindrical surface wave parallel with the interface 250 while limiting a power level of a transverse electromagnetic spherical wave, the cylindrical surface wave coupled with the interface 250 and propagating two-dimensionally from the antenna 216.

CONCLUSION

As will be appreciated from the above description, embodiments of the inventive concepts disclosed herein may provide a novel solution to efficiently launching a surface wave from a single antenna of reasonable size.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A surface wave launcher, comprising:
    a metamaterial substrate comprised of 1) a fixture having a fixed circumference and a fixture plane oriented parallel to an interface, the interface sited one of: between an ocean surface and an atmosphere above the ocean surface or between an earth surface and the atmosphere above the earth surface, and 2) a plurality of metamaterial elements coupled with the fixture;
    the plurality of metamaterial elements spatially coupled to the fixture perpendicular to the fixture plane, each one of the plurality of metamaterial elements having an equal height distal from the fixture plane, each one of the plurality of metamaterial elements spaced from another one of the of the plurality of metamaterial elements by a spacing;
    a suspension device mechanically coupled with the fixture, the suspension device configured for suspension of the metamaterial substrate relative to the interface; and
    an antenna centrally coupled with the fixture and oriented relative to the fixture plane, the antenna surrounded by the plurality of metamaterial elements, the antenna receives a signal from a signal generator powered by a power source, the signal generator controlled by a controller coupled with a memory;
    the surface wave launcher, upon receiving the signal from the signal generator, transforms a near field produced by the antenna into a field structure of a cylindrical surface wave parallel with the interface while limiting a power level of a free-propagating electromagnetic spherical wave, the cylindrical surface wave coupled with the interface and propagating two-dimensionally from the antenna.

2. The surface wave launcher of claim 1, wherein the metamaterial substrate further comprises one of: a negative dielectric permittivity metamaterial and an anisotropic metamaterial having a negative normal to an interface component of a dielectric permittivity tensor.

3. The surface wave launcher of claim 1, wherein the metamaterial substrate further comprises one of: a negative magnetic permeability metamaterial and an anisotropic metamaterial having a negative normal to an interface component of a magnetic permeability tensor.

4. The surface wave launcher of claim 1, wherein the metamaterial substrate further comprises a one of: a disc shape and an oval shape parallel to the fixture plane.

5. The surface wave launcher of claim 1, wherein the surface wave launcher transmits the cylindrical surface wave within a plurality of frequencies, one frequency range of the plurality of frequencies includes approximately 3 kHz to 30 kHz within a very low frequency (VLF) band.

6. The surface wave launcher of claim 1, wherein the suspension device further comprises a rigid flotation device configured for suspension of the surface wave launcher one of: suspended above the interface, partially submerged within the interface, and submerged below the interface.

7. The surface wave launcher of claim 1, wherein the suspension device is rigid and mechanically coupled with a circumference of the fixture.

8. The surface wave launcher of claim 1, wherein each one of the plurality of metamaterial elements comprises a wire one of: straight and folded, the wire one of: tuned via the equal height, embedded with a fixed value capacitor, embedded with a tunable capacitor, and an embedded lumped component resonator.

9. The surface wave launcher of claim 1, wherein each one of the plurality of metamaterial elements comprises a magnetic diploe-type resonator.

10. The surface wave launcher of claim 1, wherein the fixed circumference is less than 200 meters and a height of approximately one meter.

11. The surface wave launcher of claim 5, wherein the antenna is further configured to produce a signal within at least one of the plurality of frequencies.

12. The surface wave launcher of claim 1, wherein the cylindrical surface wave maintains a power which attenuates inversely with a distance from the surface wave launcher.

13. The surface wave launcher of claim 1, wherein the suspension device mechanically coupled with the fixture suspends the surface wave launcher one of: distally separate from the interface, partially within the interface, and within the interface.

14. The surface wave launcher of claim 1, wherein the antenna comprises one of: a single electrically small aperture or an array of electrically small apertures configured for transmission of a directional cylindrical surface wave, the plurality of metamaterial elements and the array are phased to mimic the field structure of the cylindrical surface wave.

15. A method for launching a cylindrical surface wave, comprising:
    suspending a fixture relative to an interface, the interface sited one of: between an ocean surface and an atmosphere above the ocean surface or between an earth surface and the atmosphere above the earth surface;
    coupling a plurality of metamaterial elements normal to the interface to form a metamaterial substrate, each one of the plurality of metamaterial elements an equal height distal from the fixture, each one of the plurality of metamaterial elements spaced from another one of the of the plurality of metamaterial elements by a spacing;
    coupling an antenna to the fixture oriented relative to the fixture; and
    transforming a near field produced by the antenna into a field structure of a cylindrical surface wave parallel with the interface while limiting a power level of a free-propagating electromagnetic spherical wave, the cylindrical surface wave coupled with the interface and propagating two-dimensionally from the antenna.

* * * * *